(No Model.) 2 Sheets—Sheet 1.
E. E. ANGELL.
SEWING MACHINE.
No. 378,075. Patented Feb. 21, 1888.
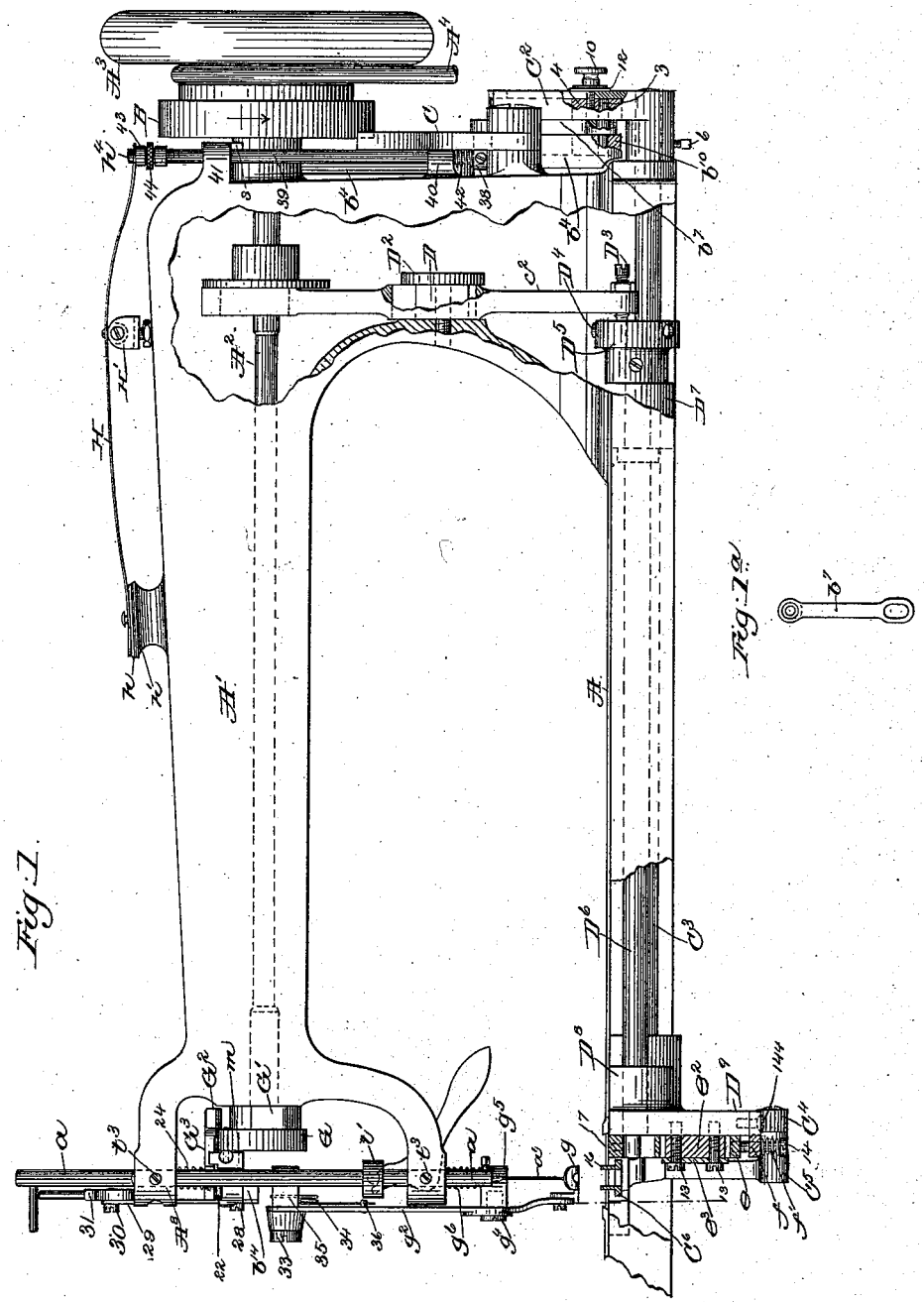
Witnesses
Fred L. Emery
John F. C. Parmenter
Inventor
Edwin E. Angell
by Crosby & Gregory
atty's (No Model.) 2 Sheets—Sheet 2.
E. E. ANGELL.
SEWING MACHINE.
No. 378,075. Patented Feb. 21, 1888.
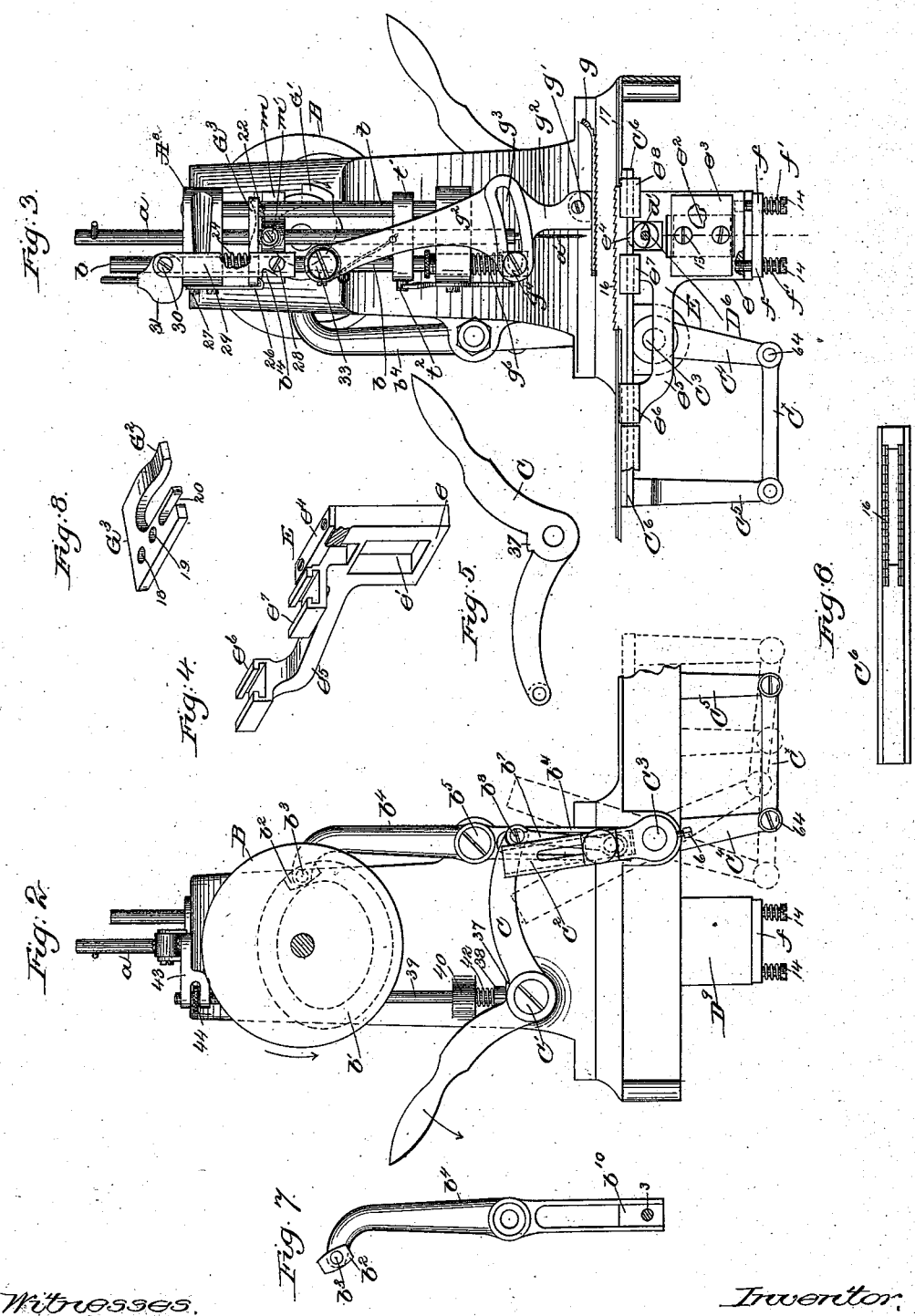
Witnesses
Fred L. Emery.
John F. C. Prinkert.
Inventor:
Edwin E. Angell.
by Crosby & Gregory attys.

UNITED STATES PATENT OFFICE.

EDWIN E. ANGELL, OF BOSTON, MASSACHUSETTS, ASSIGNOR TO THE ADDAX BASTING MACHINE COMPANY, OF PORTLAND, MAINE.

SEWING-MACHINE.

SPECIFICATION forming part of Letters Patent No. 378,075, dated February 21, 1888.

Application filed June 18, 1886. Serial No. 205,520. (No model.)

*To all whom it may concern:*

Be it known that I, EDWIN E. ANGELL, of Boston, county of Suffolk, and State of Massachusetts, have invented an Improvement in Sewing-Machines, of which the following description, in connection with the accompanying drawings, is a specification, like letters on the drawings representing like parts.

This invention has for its object the production of a sewing-machine more especially adapted for basting clothing, for which work a long stitch is required, the stitch merely temporarily retaining the main part of the garment, linings, waddings, &c., in place, to be subsequently stitched, the machine being, however, adapted for ordinary sewing, if desired.

My invention herein contained relates more especially to mechanism whereby the length of the feed may be quickly varied to make a long stitch, suitable for basting, and in connection therewith mechanism for automatically varying the tension on the needle-thread in accordance with the length of the stitch. Herein I have shown the presser-foot as adapted to rise and fall as a lifting presser-foot, and also, when desired, to move backward and forward with relation to the cloth-plate of the machine, it moving backward with the feed-dog and forward over the material after the completion of its feed-stroke, the foot thus having four motions.

The particular features in which my invention consists will be hereinafter described, and specifically pointed out in the claims.

Figure 1 is a front side elevation of a sewing-machine embodying my invention, a part of the frame-work being broken out, other parts being in section, to better show the working parts, the presser-foot being shown in elevated position; Fig. 1ª, a detail of the link $b^7$. Fig. 2 is a rear side elevation of the machine, the belt-receiving wheel being omitted. Fig. 3 is a front or left-hand elevation thereof, the rotating hook employed to co-operate with the needle being omitted. Fig. 4 is a detail showing in perspective the feed-carrier. Fig. 5 is a rear side elevation of the feed-regulating lever and its attached cam to effect the change of tension; Fig. 6, a top view of the feed-bar detached; Fig. 7, a detail showing one of the levers separated from the machine, and Fig. 8 is a separate view of the lever and the shank of the dog to lift the presser-bar.

Referring to the drawings, A represents the bed-plate, and A' the overhanging arm, all of usual shape, the forward end of the said arm being forked and provided with suitable bearings for the needle-bar $a$, the shank $b$ of the presser-bar, and a guide-rod, $t$. The needle-bar has attached to it an eye-pointed needle, $a'$.

The main rotating shaft $A^2$, supported in usual bearings in the overhanging arm, is provided at its rear end with a balance or belt wheel, $A^3$, the hub of which is scored for the reception of the usual driving belt or band, $A^4$, the said shaft also carrying the fly-wheel and a cam-disk, B, grooved at its face, as at $b'$. (See dotted lines, Fig. 2.) This groove $b'$ receives in it the shoe $b^2$, pivoted loosely upon a stud, $b^3$, connected to the upper end of the lever $b^4$, (see Fig. 7,) having its fulcrum at $b^5$, (see Fig. 2,) the lower end of the said lever below the said fulcrum being grooved (see, also, Fig. 7) for the reception of a block, $b^{10}$, connected loosely with a pin, 3, carried by the lower end of the link $b^7$, jointed at $b^8$ to the outer end of the stitch-regulating lever C, pivoted at C', the handle of the said lever being within easy reach of the right hand of the operator. The pin 3 has at its other end a loose block, 4, which enters a groove in an arm, $C^2$, the lower end of which is attached by a screw, 6, to the rock-shaft $C^3$, having its bearings in lugs or ears at the under side of the bed-plate, the said rock-shaft at its forward end having secured to it the arm $C^4$, which, by a link, $C^x$, is attached to the depending leg $C^5$, rigidly attached to the rear end of the feed-dog $C^6$, (shown separately in Fig. 6,) the said rock-shaft and link effecting the forward and backward movement of the feed-dog, and consequently governing the length of the stitch, the stitch being made longer or shorter by turning the lever C upon its fulcrum, the movement of the lever in the direction of the arrow thereon, Fig. 2, shortening the feed. The hole in the lower end of the link $b^7$, (see Fig. 1ª,) for the reception of the pin 3, is of enough greater diameter than the said pin to prevent the movement of the lever C while the lever $b^4$ is being moved to vibrate the arm $C^2$ and rock-shaft $C^3$ to effect the feed.

In Fig. 2 the machine is set for its longest stitch. The block 4 (see Fig. 1) is entered by the shank of a thumb-screw, 10, inserted through a slot of the arm $C^2$, and also through a leather or other friction plate or device, 12, the said screw by its action upon the washer producing sufficient friction to keep the lever C and the parts for varying the length of the feed in the position in which they have been adjusted by the operator.

The main shaft has attached to it an eccentric, $c$, which is surrounded by the upper end of a link, $c^2$, slotted at its central portion to embrace a block, D, mounted loosely upon a stud, $D^2$, of the frame-work, the lower end of the said link $c^2$ having a screw, $D^3$, which enters a sliding block or pin, $D^4$, placed in a radial slot in a disk, $D^5$, secured to the hook-shaft $D^6$, supported in suitable bearings, $D^7 D^8$, at the lower side of the frame-work. The said hook-shaft at its forward end will have a hook substantially the same in construction and operation as the hook used in the Willcox & Gibbs sewing-machine, the said shaft at the rear of the said hook being provided with a cam or eccentric, $d'$, which is employed to raise and lower the feed-bar at the proper times to engage and release the cloth.

The bearing $D^8$ has a hanger, $D^9$, (see Fig. 1,) the front face of which is planed or made smooth to receive against it the foot $e$ of the feed-bar carrier E, (shown separately in Fig. 4,) the open slot $e'$ in the said feed-bar carrier being entered by a block, $e^2$, which is connected to the hanger $D^9$ by screws 13, the said screws being first inserted through holes in a plate, $e^3$, which, being of greater size than the block $e^2$, acts against the foot $e$ of the feed-bar carrier, making an outer guide for it.

The hanger $D^9$ has attached to its under side, by screws 144, a plate $f$, provided with two holes for the reception loosely of two studs, 14, which, as herein shown, are screwed into the lower end of the foot $e$, the said studs below the plate $f$ and between the said plate and their heads receiving upon them spiral springs $f'$, the said springs acting normally to keep the cross-bar $e^4$ of the feed-dog carrier E in contact with the eccentric $d'$, attached to the hook-shaft, the said feed-dog carrier being raised vertically by the said eccentric just before or as the toothed surface of the feed-bar $C^6$ is to rise through the slotted plate 17, to engage and feed the material for a stitch. The feed-bar carrier E has a backwardly-extended arm, $e^5$, having a guide, $e^6$, the main part of the said carrier having two other guides, $e^7 e^8$, which receive and guide the feed-bar in its reciprocations.

In Fig. 4 the guide $e^8$ is omitted from the feed-bar carrier, in order to better show the cross-bar $e^4$ and the slot in which works the eccentric $d'$, attached to the hook-shaft, the said eccentric operating to raise the carrier and feed-bar.

The shaft $A^2$ at its forward end has attached to it the disk G, and just back of it a cam, $G'$, the latter operating at each rotation upon an arm, $G^2$, of a lifting plate or dog, $G^3$, (shown separately in Fig. 8,) the said plate having two holes, 18 19, and a slot, 20, the hole 18 receiving loosely the presser-foot bar $b$, the needle-bar $a$ passing freely through the hole 19, of considerably greater area, while the slot 20 embraces the guide-rod $t$, having a pin, 22. The plate $G^3$ is acted upon at its upper side by a spiral spring, 24, placed between it and the upper bearing, $A^8$, through which moves the presser-shank $b$, the said spring normally acting to keep the lower side of the said plate against a hook, 26, attached by screws 27 to the head of the machine, that end of the plate $G^3$ surrounding the guide-rod $t$ resting normally against the pin 22 therein. The presser-bar $b$ below the lifting-plate $G^3$ is surrounded loosely by a block, $b^{14}$, the said block having connected to it, by a screw, 28, the link 29, which is extended upwardly above the head of the machine, where it has attached to it, by screw 30, a cam-lever, 31, which may, if desired, be turned to act upon the bearing $A^8$ of the machine and lift the said block, and with it the plate $G^3$, so that the arm $G^2$ thereof will not be struck by the cam $G'$ in its rotation. When the plate $G^3$ is left under the control of the spring 24 and permitted to rest on the hook 26 and pin 22, then during each rotation of the shaft $A^2$ the cam $G'$ thereon will act upon the arm $G^2$ of and lift one end of the said plate, while its other end is held down by the spring 24, so that the edges of the hole 18 in the said plate will bite the presser-bar shank $b$, and thereafter during the remainder of the time that the said plate is being acted upon by the cam $G'$ the presser-bar will be lifted, and with it its attached devices; but as the said cam passes out from under the said plate the spring 24 throws it down against the said hook 16 and pin 22, leaving the plate $G^3$ in condition to be again elevated to act as a dog to lift the presser-bar.

The presser-foot $g$ is herein shown as attached by a screw, $g'$, to the lower end of a foot-carrying lever, $g^2$, pivoted by a screw, 33, to the presser-foot shank $b$, the said lever $g^2$ having a slot, $g^3$, to receive a screw, $g^4$, which is screwed into a block, $g^5$, attached by a suitable screw to the lower end of the presser-bar shank $b$, the said shank being surrounded above the said block by a spiral spring, $g^6$, which normally acts to keep the said foot down upon the work.

The screw $g^4$ may be turned in so tight as to prevent the movement of the lever $g^2$ upon its fulcrum. The screw 33, or, if the said lever is left loose, the foot $g$, will be free to move backward with the material as it is acted upon at its lower side by the teeth 16 of the feed-bar $C^6$, the said lever being preferably left free, so that the foot may be moved backward with the material when a very long stitch is being made, the presser-foot at such times being lifted as soon as the material has been moved far enough for a stitch, so that when elevated above the material the spring 34, attached to a block, 35, secured to and rising and falling with the presser-bar $b$ and acting upon a pin, 36, of the said lever $g^2$, throws the same forward or toward the operator preparatory to the descent of the foot upon the material and the rising of the feed-bar $C^6$ to grasp the material and move it in the formation of a new stitch.

It will be observed that the presser-foot bar is free to descend upon the material, whatever may be its thickness, and is always lifted from the surface of the material sufficiently to permit the cloth to be released from the presser-foot. The presser-foot is raised while the feed-bar is moving backward and the needle is rising.

I wish it to be expressly understood that in some instances and for some classes of work I shall omit the plate $G^3$, or so elevate and hold it elevated that the cam $G'$ in its rotation cannot strike the arm $G^2$ of the plate to move it to bite the shank $b$ and lift it.

The hub of the lever C has a cam, 37, (shown in Fig. 5,) against which rests the foot 38, attached to the vertical rod 39, extended through the lugs 40 41, the said foot being normally held down against the said cam by means of a spring, 42. The upper end of this rod has secured loosely upon it a tension-regulating block, 43, which is made vertically adjustable thereon by means of a thumb-nut, 44, which engages a screw-thread at the upper end of the said rod.

The rotation of the rod 39 is prevented by the spline $s$, which enters a slot in the lug 41. (See Fig. 1.) The tension-regulating lever H is pivoted upon a block in a stand, H′, erected upon the overhanging arm. The front end of this lever has pivoted upon it a clamping-plate, $h$, which bears upon the thread passing from a suitable spool between it and the plate or rest $h'$.

The rear end of the tension-regulating lever is extended backward over and attached to the block 43 by a screw, $h^4$, so that the said lever is compelled to follow the block 43 and rod 39 as they are moved by or through the feed-regulating lever C. When the outer end of the lever C is elevated to make the longer stitch, the cam 37 presents to the foot its smallest radius, permitting the rod and block to descend and reduce the tension of the lever H on the thread to the minimum, the depression of the said lever in the direction of the arrow, Fig. 2, to shorten the stitch, causing the cam 37, acting upon the foot, to gradually raise the rod and increase the tension upon the material.

To secure the proper maximum and minimum tension for different classes of goods, the nut 44 may be turned upon the rod, to elevate or depress the block 43, as the case may be.

The disk G at its front side has a suitable crank-pin, which enters a slide-piece, herein shown as a short rod, which enters a hole in the cross-head $m$, attached by screw $m'$ (see Fig. 3) to the needle-bar $a$, the rotation of the disk G effecting the reciprocation of the needle-bar in usual manner.

The presser-bar shank $b$ has connected to it, by a screw, $t^2$, a block, $t'$, which has two holes or openings, one of which serves for the passage of the needle-bar, while the other receives in it the guide-rod $t$, which is fastened to the head of the machine by the screws $t^3$, the said block, in connection with the guide-bar $t$, insuring accuracy of movement of the presser-bar $b$.

In the machine herein shown the part co-operating with the needle $a'$ and its thread to form a stitch has been omitted.

The hook cut from the outer end of the shaft was just like that common to the Willcox & Gibbs sewing-machine; but I desire it to be understood that my improved feeding mechanism might be used equally well with a machine wherein the stitch is composed of two threads, the second thread being carried by a shuttle.

I claim—

1. The main shaft, the cam B, lever $b^4$, moved by it, the rock-shaft having arms $C^2$ $C^4$, the link $C^x$, and feed-bar having the rigid arm $C^5$, combined with the block engaged by both the lever $b^4$ and the arm $C^2$, and with the link $b^7$ and lever C, to operate substantially as described.

2. The vibrating lever $b^4$, grooved at its lower end, the rock-shaft having the grooved arm $C^2$, and the block 4 therein, and pin to carry the block, combined with the lever C and link $b^7$, having a slot embracing the said pin to enable the lever $b^4$ and arm $C^2$ to be vibrated without moving the lever C, substantially as described.

3. The presser-bar, the lifting-plate $G^3$, surrounding the presser-bar loosely and provided with an arm, $G^2$, and the cam to act upon the said arm, combined with the stop 26 and the spring 24, to operate substantially as described.

4. The presser-bar $b$, the block $b^{14}$, surrounding the said bar loosely, the link 26, and lever to lift it, combined with the plate $G^3$, having the arm $G^2$, the cam to move it, and the spring 24 and a stop, 22, to govern the descent of the said plate, substantially as described.

5. The combination, with the presser-bar, of the lever $g^2$, pivoted at or near its upper end to said bar, and having the slot $g^3$ and the pivoted foot $g$, the screw $g^4$, and a retracting-spring for said lever, substantially as set forth.

6. The feed-bar carrier having a series of guides for the reception of the feed-bar and an opening, $e'$, the block $e^2$, fitted into the said opening, the plate $e^3$, means to attach the said block and plate, and means, substantially as described, to raise and lower the said feed-bar, combined with the feed-bar $C^6$ and a crank and rock-shaft to move it variable distances, substantially as described.

7. The feeding mechanism and the feed-regulating lever provided with a cam, combined with the tension device, the tension-regulating lever-spring H, and the rod 39, the lower end of which impinges against said cam and the upper end of which is connected with the said lever-spring, substantially as set forth.

8. The combination, with the thread-rest $h'$, of the tension-regulating lever H, the clamping-plate $h$ at the forward end of said lever, the block H', to which the said lever is pivoted between its ends, and an adjustable abutment, as block 43, to act on the rear end of said lever to vary the pressure of the clamping-plate on the thread, substantially as set forth.

In testimony whereof I have signed my name to this specification in the presence of two subscribing witnesses.

EDWIN E. ANGELL.

Witnesses:
GEO. W. GREGORY,
C. M. CONE.